United States Patent [19]

Tada et al.

[11] 4,379,685
[45] Apr. 12, 1983

[54] INJECTION MOLDING MACHINE

[75] Inventors: Tetsuya Tada, Tokyo; Yutaka Morishita, Shiki, both of Japan

[73] Assignee: Canyon Corporation, Tokyo, Japan

[21] Appl. No.: 288,405

[22] Filed: Jul. 30, 1981

[30] Foreign Application Priority Data

Feb. 5, 1980 [JP] Japan ................... 55-12676

[51] Int. Cl.³ .............................................. B29F 1/00
[52] U.S. Cl. ................................ 425/183; 264/328.8; 264/328.11; 264/297; 425/185; 425/190; 425/438; 425/556
[58] Field of Search ................... 425/129 R, 183, 185, 425/190, 438, 556; 264/297, 328.8, 328.11

[56] References Cited

U.S. PATENT DOCUMENTS 3,982,869 9/1976 Eggers ........................... 425/246
4,205,950 6/1980 Süss ........................... 425/129 R X

FOREIGN PATENT DOCUMENTS 1184463 12/1964 Fed. Rep. of Germany .
295123 12/1971 Fed. Rep. of Germany .

OTHER PUBLICATIONS

Zeitschrift: "Kunststoffe", 1969, Heft 4, Seite 217/218.

Primary Examiner—Thomas P. Pavelko
Attorney, Agent, or Firm—Frishauf, Holtz, Goodman & Woodward

[57] ABSTRACT

An injection molding machine comprises an injection mechanism for heating and melting molding material and for injecting the molten material into cavities defined by a fixed die and a movable die and a die clamping mechanism for clamping and separating the fixed die and movable die. The fixed die is attached to a fixed platen provided near the injection mechanism and the movable die is attached to a movable platen provided near the die clamping mechanism. The die clamping mechanism is movable in a horizontal direction. A slider is provided on said movable platen and can reciprocably slide in a horizontal direction different from the direction in which the die clamping mechanism moves, and the aforesaid movable die and another movable die are attached to the slider so as to alternately come into face-to-face relation with the fixed die as the slider reciprocates.

2 Claims, 11 Drawing Figures

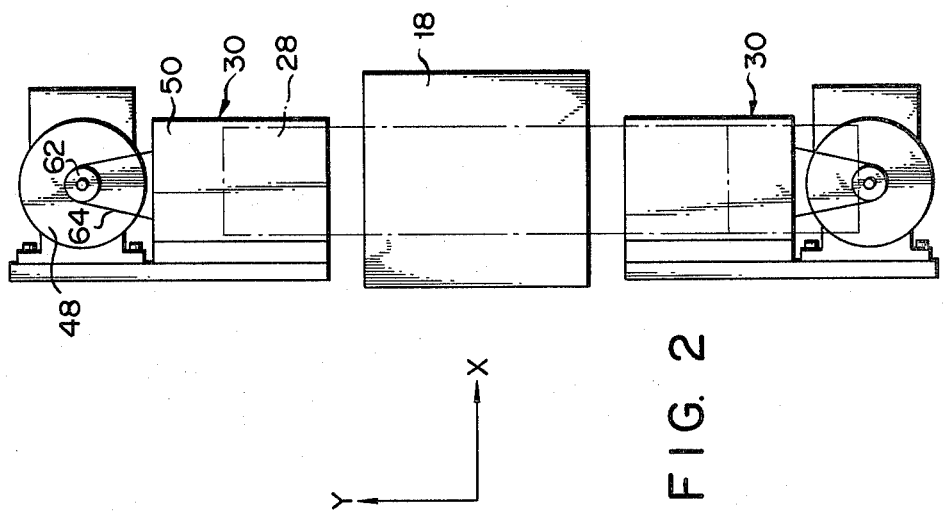
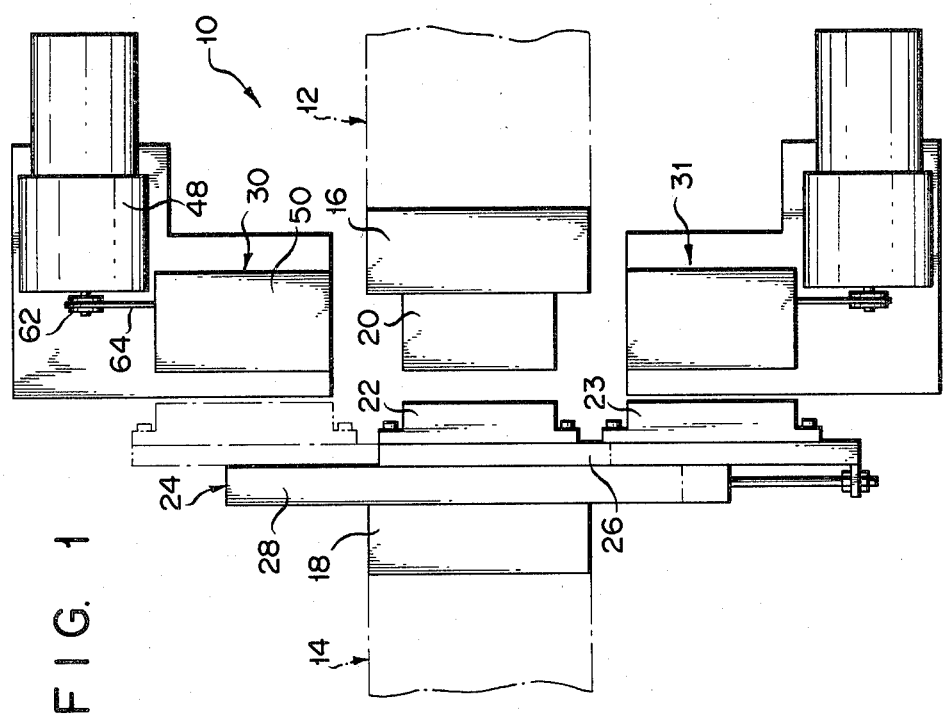

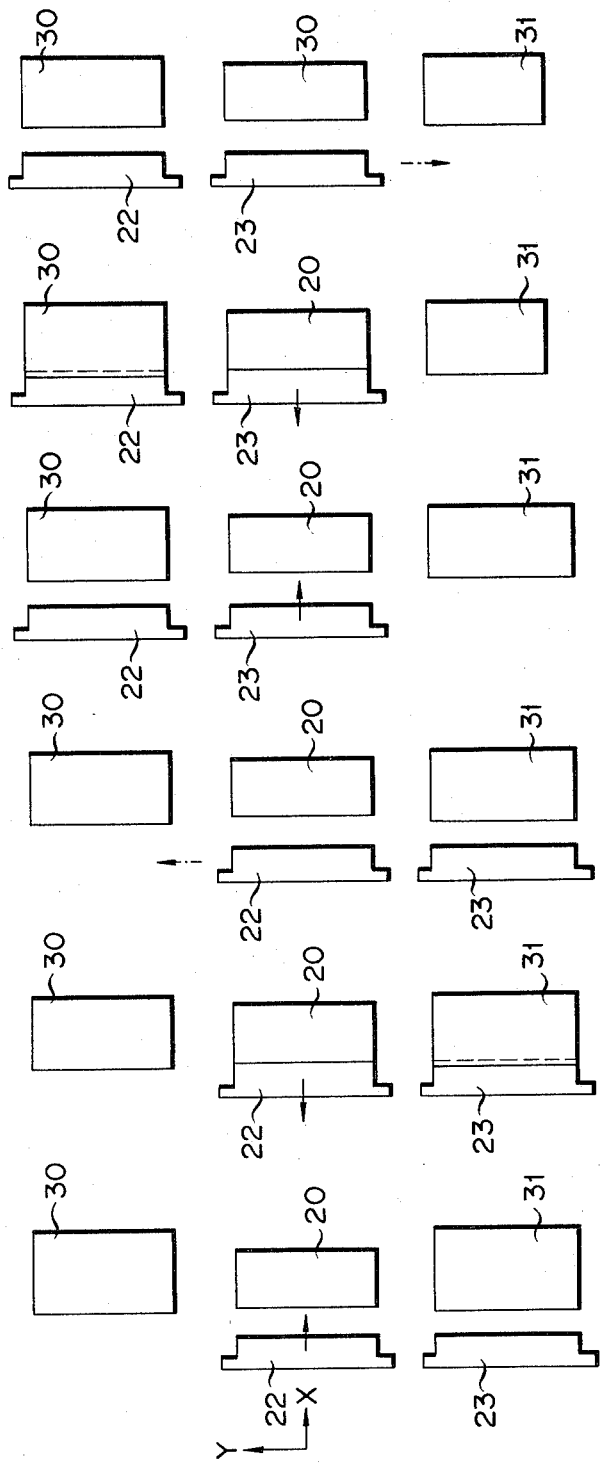

INJECTION MOLDING MACHINE

BACKGROUND OF THE INVENTION

This invention relates to an injection molding machine.

In general, injection molding machines include an injection mechanism for heating and melting molding material and for injecting the molten material into cavities defined by a pair of dies, and a die clamping mechanism for clamping and opening the dies. These injection molding machines are classified into three types; vertical, horizontal, and vertical-horizontal. In the vertical or horizontal type, both the injection mechanism and the die clamping mechanism are disposed vertically or horizontally. In the vertical-horizontal type, on the other hand, one of those mechanisms is disposed vertically, while the other is disposed horizontally.

A conventional injection molding machine generally uses a pair of dies which are severally attached to a fixed platen on the injection mechanism side and a movable platen on the die clamping mechanism side. The latter or movable die is separated from the former or fixed die by the die opening operation of the die clamping mechanism after completion of injection molding. Then, products are collected from the movable die at the same station as the station for molding, automatically by a suitable product collecting mechanism or manually by an operator. Since the products are collected at the same station as the molding station, the injection molding operation is interrupted during the product collection. Thus, the injection molding operation can be performed only intermittently, so that the injection molding machine cannot be fully operated and hence is poor in productivity. With such prior art construction, moreover, the product collecting mechanism need be moved to a position where it faces the opened movable die, so that the use of the product collecting mechanism will complicate the injection molding machine in construction. Where the products are collected manually by the operator, the operating efficiency or productivity will be reduced, and it will be hard to achieve reduction of labor. Especially in insert molding, the productivity will be further reduced by insert work.

In order to eliminate the drawbacks of the aforementioned prior art injection molding machines, there have recently been proposed injection molding machines in which the product collection and/or insert work are performed at a station separate from the molding station. All these injection molding machines are of a vertical type in which the injection mechanism is so arranged as to be able to slide vertically and can perform die clamping and opening, as well as injection molding. The conventional movable dies on the die clamping mechanism side, two or three in number, are attached to a slider or turntable capable of straight or rotary movement within a horizontal plane. The injection molding machines of this type are superior in productivity to the conventional injection molding machines because of the separate station for product collection and/or insert work. Such injection molding machines, however, generally take account of the insert work, so that the movable dies used therein are disposed below the fixed die. Therefore, it is a hard task to collect the products which are normally dropped down, and the improvement in productivity is not very great. Further, there are required separate driving mechanisms for the injection mechanism and for the slider or turntable, so that the injection molding machines will be increased in size and complicated in construction. In producing threaded products, moreover, one portion of the fixed die or the movable die need be rotated and will be extremely complicated in structure.

SUMMARY OF THE INVENTION

It is therefore the object of this invention to provide an injection molding machine capable of satisfactory improvement in productivity and of high-efficiency collection of even threaded products without any increase in machine size or complication in structure.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 1 and 2 are a schematic plan view and a left side view of the principal part of an injection molding machine according to an embodiment of this invention, respectively;

FIGS. 3A to 3F are molding schedule diagrams for illustrating steps of operating procedure of movable dies;

DETAILED DESCRIPTION OF THE PREFERRED EMBODIMENT

Figure 4:
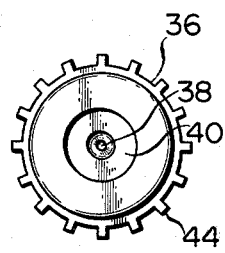
FIGS. 4 and 5 are a front view and a side view half in section of a nozzle cap as an example of a threaded product, respectively.

Now a preferred embodiment of this invention will be described in detail with reference to the accompanying drawings.

As shown in FIG. 1, an injection molding machine 10 according to the invention includes an injection mechanism 12 and a die clamping mechanism 14 both arranged horizontally, a fixed platen 16 attached to the injection mechanism 12 and a movable platen 18 attached to the die clamping mechanism 14. The fixed platen 16 is fitted with a fixed die 20, while the movable platen 18 is mounted with a slider 24 carrying a pair of movable dies 22 and 23. Like the one used in a conventional horizontal injection molding machine, the movable platen 18 is so designed as to be able to be reciprocated along the X-axis by the die clamping mechanism 14. As for the slider 24, one of the features of the invention, it includes a slider body 26 carrying the movable dies 22 and 23 and capable of reciprocating along the Y-axis perpendicular to the X-axis within a horizontal plane and a slider guide 28 fixed to the movable platen 18 to guide the slide body 26 in its slide. The movable dies 22 and 23 on the slider body 26 are so located as to be able to face the fixed die 20 alternately when the slider body 26 slides. As shown in FIGS. 1 and 2, a pair of product collecting mechanisms 30 and 31 capable of facing one of the movable dies off the molding station are disposed on both sides of the fixed die 20, respectively. In this illustrative embodiment, the product collecting mechanisms 30 and 31 can face the movable dies 22 and 23, respectively. Being of conventional construction, the die clamping mechanism 14 for reciprocating the movable platen 18, together with the slider 24 and the movable dies 22 and 23, along the X-axis for die clamping and opening will not be described in detail herein. Nor will the injection mechanism 12 be detailed because of its having conventional structure.

Referring now to the drawings of FIGS. 3A to 3F, there will be described in detail molding processes of the injection molding machine 10 of the aforementioned construction. In FIGS. 3A to 3F, solid- and chain-line arrows indicate directions in which the movable dies in the illustrated positions are to move next. The solid-line arrows are indicative of the movement of the movable dies caused by the movement of the movable platen 18, while the chain-line arrows are indicative of the movement of the movable dies caused by the movement of the slider body 26. The movable dies 22 and 23 move between the molding station facing the fixed die 20 and product collecting stations facing the product collecting mechanisms 30 and 31, respectively. In FIG. 3A, the movable dies 22 and 23 are supposed to be located in the molding station and the product collecting station, respectively. Thereupon, the movable platen 18 is advanced along the X-axis by the die clamping mechanism 14 to clamp the movable die 22, and thus injection molding is performed by the injection mechanism 12 (see FIGS. 3A and 3B). When the injection molding is achieved, the movable platen 18 is retreated along the X-axis by the die clamping mechanism 14 to open the movable die 22 (see FIGS. 3B and 3C). When the movable platen 18 is moved to a predetermined position to open the die, the slider body 26 advances along the Y-axis so that the movable dies 22 and 23 are located at the product collecting station and the molding station, respectively. Namely, as shown in FIGS. 3C and 3D, the movable die 22 moves to the position where it faces the product collecting mechanism 30, while the movable die 23 moves to the position where it faces the fixed die 20. The slider body 26 can be easily moved by using a conventional driving mechanism. Again, the movable platen 18 advances along the X-axis to clamp the die for injection molding (see FIGS. 3D and 3E). In such die clamping for injection molding, products in the movable die 22 located at the product collecting station are collected by the product collecting mechanism 30, and dropped into a suitable collecting means (not shown). To prevent reduction in productivity, the time required for the product collection should preferably be less than the time required for the die clamping and injection molding. After the die clamping and injection molding, as well as the product collection, are achieved, the movable platen 18 is retreated along the X-axis to open the die (see FIGS. 3E and 3F). Then, the slider body 26 is retreated along the Y-axis to restore the movable dies 22 and 23 to their initial positions shown in FIG. 3A. Thereafter, the movable platen 18 is advanced along the X-axis to clamp the movable die 22 as aforesaid, and then injection molding is performed (FIG. 3B). In such die clamping and injection molding, products in the movable die 23 located in the product collecting station are collected by the product collecting mechanism 31, and dropped into a suitable collecting means (not shown). Thereafter, the aforementioned processes are repeated successively.

Figure 5:
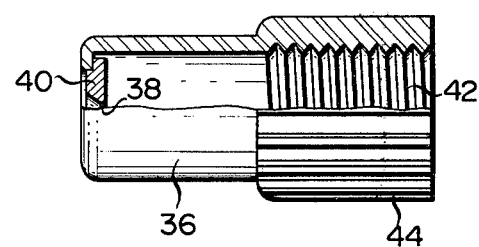

Now there will be described an example of the product collecting mechanisms 30 and 31 in conjunction with the way of molding a nozzle cap 36 used in a sprayer as shown in FIGS. 4 and 5. The nozzle cap 36 is screwed on the main body of the sprayer, and the spraying condition can be adjusted by changing the screwing position. A separate nozzle plate 40 with a spray orifice 38 is fitted in the tip end portion of the nozzle cap 36. An internal thread portion 42 is formed on the inner surface of the nozzle cap 36, while splines 44 for smooth rotation of the nozzle cap 36 are formed on the outer circumferential surface of the nozzle cap 36. Since the spray orifice 38 is a very small hole with a diameter as short as 0.4 mm or thereabouts, if the nozzle cap 36 and the nozzle plate 40 are integrally formed by using the conventional injection molding machine with one portion of the movable die of the die clamping mechanism side, these products may suffer burr. Further, a pin for the spray orifice 38 is difficult to locate and is liable to abrasion, and it is very difficult to form the nozzle plate and the nozzle cap integrally. The nozzle plate and the nozzle cap, therefore, are usually formed separately. In the injection molding machine of the invention having the aforementioned construction, however, the die clamping mechanism does not rotate, and the products can be collected by the rotation of the product collecting mechanisms, so that the nozzle cap 36 and the nozzle plate 40 can be easily formed in a body and be collected by the product collecing mechanisms 30 and 31.

Figure 6:
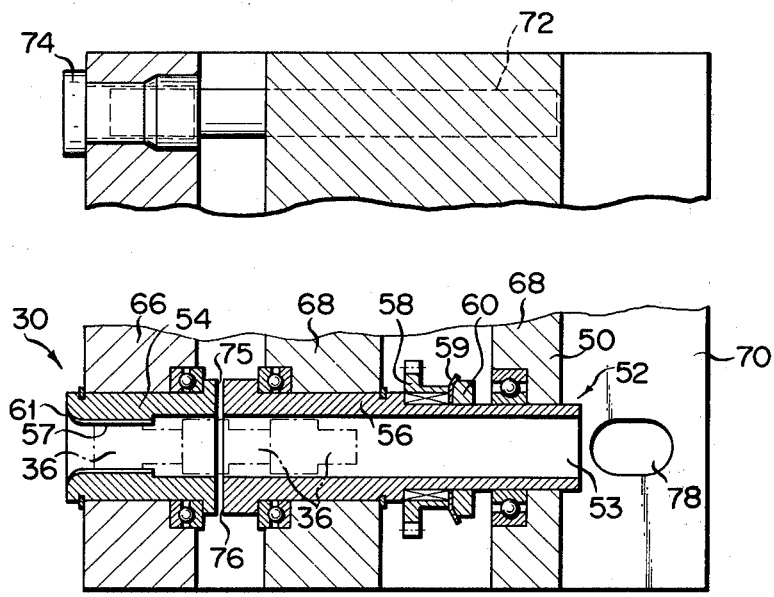
FIG. 6 is a schematic sectional view showing the principal part of an example of a product collecting mechanism.

Now the construction of the product collecting mechanism 30 will be described in detail. It is to be understood that the product collecting mechanisms 30 and 31 have the same construction. As shown in FIGS. 1 and 2, the product collecting mechanism 30 includes an electric motor 48 serving as a driving source, and a main body 50 for product collection using a clutch. As shown in FIG. 6, the main body 50 rotatably bears a number of sets of hollow shafts 52 (only one set shown in FIG. 6) corresponding to the number of cavities defined the movable and fixed dies. Each of the hollow shafts 52 includes first and second shafts 54 and 56 each having a center bore 53 in which the nozzle cap is loosely fitted. The first shaft 54 on the side facing the movable die is provided, at the front end portion of the inner circumferential surface of its center bore, with a multitude of elongated grooves 57 in which the splines 44 of the nozzle cap are fitted, as well as with a guide 61 for aligning the splines 44 in the grooves 57. Further, a spur gear 58 is fixed on the second shaft 56 by a washer 59 and a nut 60, and a toothed endless belt 64 (FIG. 1) is stretched between a toothed pulley 62 (FIG. 1) of the motor 48 and the spur gear 58. The main body 50 consists of a first body portion 66 bearing the first shaft 54 and a second body portion 68 bearing the second shaft 56. The second body portion 68 is fixed on a base 70, while the first body portion 66 is slidably held on the second body portion 68 by a plurality of retaining pins 72 (only one shown in FIG. 6). Moreover, a plurality of abutment pins 74 (only one shown in FIG. 6) capable of abutting on the movable die protrude from the first body portion 66 toward the movable die.

In the product collecting mechanism 30 of the above-mentioned construction, the second shaft 56 is continually rotated by the motor 48 during the operation of the injection molding machine 10. When the movable die 22 facing the product collecting mechanism 30 advances from the position of FIG. 3D to the position of FIG. 3E, the surface of the movable die 22 abuts on the abutment pins 74. Then, the tip end portion of the product (nozzle cap 36 in this case) in the movable die 22 is inserted in the center bore 53 of the first shaft 54, and the splines 44 of the nozzle cap 36 are aligned in the grooves 57 by the guide 61. Thereafter, the movable die 22 advances along with the first body portion 66 while abutting on the abutment pins 74, and the respective facing surfaces 75 and 76 of the first and second shafts 54 and 56 abut on each other at the point of time of die clamping. Thus, the rotatory force of the second shaft 56 is transmitted to the first shaft 54, and the first and second shafts 54 and 56 rotate in one united body. Since the rotating direction of the second shaft 56 is coincident with the direction in which the nozzle cap 36 is separated from the movable die 22, the rotation of the first shaft 54 causes the nozzle cap 36 to advance to the right in the center bore 53 and to be automatically collected from the movable die 22. By repeating such collecting processes, a number of nozzle caps 36 are fed to the right in the center bore 53, and then automatically dropped and collected from the second shaft 56 into the collecting means (not shown) through a hole 78.

According to this invention, as described above, a pair of movable dies 22 and 23 alternately face the fixed die 20, and one of the movable die 22 not facing the fixed die 20 normally faces the product collecting mechanism 30 and 31. Since the products are collected at a collecting station separate from the molding station, the injection molding machine 10 can enjoy full operation to improve productivity without interrupting the injection molding operation to facilitate product collection. Further, the die clamping mechanism 14 is disposed horizontally, and the movable dies 22 and 23 are mounted on the die clamping mechanism 14. Therefore, natural dropping of the products can be utilized for the product collection. Namely, the product collection can be easily achieved by only extracting the products from the movable die. Thus, even the manual product collection by the operator will hardly result in any reduction in productivity. Since the product collecting mechanisms 30 and 31 can be easily disposed on both sides of the fixed die 20 so as to be able to face the movable dies, the injection molding machine of the invention is labor-saving. Moreover, these product collecting mechanisms 30 and 31 are located in such a space that the actions of the reciprocating die clamping mechanism 14 and slider 24 will not be disturbed. Accordingly, the attachement and detachment of the dies, as well as the maintenance of other movable parts, can be facilitated. The slider 24 carrying thereon the movable dies 22 and 23 are disposed on the movable platen 18 of the movable die clamping mechanism 14, thus concentrating the movable parts in a relatively limited space. Accordingly, the driving mechanisms for the die clamping mechanism 14 and for the slider 24 can be centralized. According to this invention, moreover, each product collecting mechanism is disposed opposite to its corresponding movable die, so that threaded products can be easily collected by rotating a suitable component of the product collecting mechanism. Thus, there may be provided a highly versatile injection molding machine capable of collecting threaded products with ease and high efficiency.

What we claim is:

1. An injection molding machine comprising:
   a fixed die and a movable die defining cavities therebetween;
   a die clamping mechanism coupled to said fixed and movable dies for clamping and separating said fixed and movable dies, said die clamping mechanism being movable in a horizontal direction;
   an injection mechanism for heating and melting molding material and for injecting the molten material into said cavities defined by said fixed die and said movable die;
   a fixed platen provided near said injection mechanism and to which said fixed die is attached;
   a movable platen provided near said die clamping mechanism and to which said movable die is attached;
   a slider provided on said movable platen and which is reciprocably slideable in a horizontal direction different from the horizontal direction in which said die clamping mechanism is movable;
   said movable die and another movable die being attached to said slider so as to alternately come into face-to-face relation with said fixed die as said slider reciprocates;
   a pair of product collecting mechanisms respectively disposed on both sides of said fixed die, and arranged to face one of said movable dies which is not facing said fixed die, each of said pair of product collecting mechanisms including:
   a product collecting main body having first and second body portions, said first body portion being slideably mounted to said second body portion;
   a plurality of first hollow shafts rotatably mounted on said first body portion, said first hollow shafts having respective center bores and being arranged such that a threaded product in said movable die is inserted in a center bore of each said first hollow shafts to be taken out of said movable die; and
   a plurality of second hollow shafts as many as said first hollow shafts rotatably mounted to said second body portion, each second hollow shaft having a center bore through which said threaded product can pass;
   said first and second hollow shafts having end faces which face each other; and
   a power source coupled to said second hollow shafts for rotating each of said second hollow shafts so that facing end faces of said first and second hollow shafts selectively come into contact with each other to selectively frictionally transmit force therebetween.

2. The injection molding machine of claim 1, wherein said first body portion comprises a plurality of abutment pins extending therefrom toward said movable die to a position so that said movable die may abut on said abutment pins to slide said first body portion toward said second body portion, thereby bringing the facing end faces of said first and second hollow shafts into contact with each other when said die clamping mechanism clamps said dies.

* * * * *